United States Patent
Yanagiguchi et al.

(10) Patent No.: US 6,930,142 B2
(45) Date of Patent: Aug. 16, 2005

(54) SEAL RING

(75) Inventors: Tomihiko Yanagiguchi, Settsu (JP); Masamichi Sukegawa, Settsu (JP); Michio Asano, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 81 days.

(21) Appl. No.: 10/239,500

(22) PCT Filed: Mar. 21, 2001

(86) PCT No.: PCT/JP01/02222

§ 371 (c)(1),
(2), (4) Date: Sep. 23, 2002

(87) PCT Pub. No.: WO01/70854

PCT Pub. Date: Sep. 27, 2001

(65) Prior Publication Data

US 2003/0111798 A1 Jun. 19, 2003

(30) Foreign Application Priority Data

Mar. 24, 2000 (JP) ......................... 2000-084832
Jun. 20, 2000 (JP) ......................... 2000-184811

(51) Int. Cl.⁷ .................................................. C08F 3/00
(52) U.S. Cl. .................. 524/544; 524/494; 524/495; 524/543
(58) Field of Search ................. 524/544, 543, 524/494, 495

(56) References Cited

U.S. PATENT DOCUMENTS 5,888,424 A * 3/1999 Ebnesajjad et al. ...... 252/301.5
6,037,402 A * 3/2000 Asano et al. ............... 524/545

FOREIGN PATENT DOCUMENTS

| EP | 0 583 481 | | 2/1994 |
|---|---|---|---|
| EP | 0583481 A1 | * | 2/1994 |
| JP | 8-319391 | | 12/1996 |
| JP | 9-324091 | | 12/1997 |
| JP | 11-116623 | | 4/1999 |

OTHER PUBLICATIONS

International Search Report for PCT/JP01/02222 dated Apr. 24, 2001.

English Translation of International Preliminary Examination Report for PCT/JP01/02222 Dated Dec. 26, 2001.

* cited by examiner

*Primary Examiner*—David W. Wu
*Assistant Examiner*—Henry S. Hu
(74) *Attorney, Agent, or Firm*—Sughrue Mion, PLLC

(57) ABSTRACT

A seal ring with a sliding surface, which is obtained by molding a molding powder or granulated powder of non-melt-moldable modified polytetrafluoroethylene containing 0.01 to 1% by weight of a perfluorovinylether unit represented by the formula (I):

$$-CF_2-CF(-O-X)- \qquad (I)$$

wherein X represents a perfluoroalkyl group having 1 to 6 carbon atoms or a perfluoroalkoxyalkyl group having 2 to 9 carbon atoms, the modified polytetrafluoroethylene having a heat of crystallization of 18 to 25J/g measured by a differential scanning calorimeter.

9 Claims, 1 Drawing Sheet

SEAL RING

TECHNICAL FIELD

The present invention relates to a seal ring, particularly a seal ring which has excellent sliding durability under high pressures. The seal ring of the present invention can be suitably used particularly as a seal ring for oil sealing of a power steering valve.

BACKGROUND ART

Polytetrafluoroethylene (PTFE) has been used as a material for a seal ring for oil sealing which has been used as a sliding member under high temperature and high pressure of oil while making the use of characteristics such as non-tackiness, sliding property and heat resistance.

Many of such seal rings for oil sealing having a sliding surface (after this, simply referred to as "seal ring") are of endless type, for example, as shown in a diagrammatic cross-sectional view of FIG. 1, and are usually used for such an application as shown in a diagrammatic cross-sectional view of FIG. 2. Namely, the seal ring 1 is a ring-like member which is put between the two members (housing 2 and seal ring set body 3) undergoing relative motion at a rotating portion or a sliding portion and is used to seal oil 4. In FIG. 2, the seal ring 1 is wound over the seal ring set body 3 and forms a sliding surface to the housing 2. During the use, the seal ring set body 3 rotates on the housing 2, and a relatively high pressure is applied to the seal ring from the oil 4. Further when a load is applied to the seal ring by repeated normal and reverse rotations, there is a case where breakage of the seal ring occurs relatively earlier, resulting in leaking of the oil 4.

When the seal ring 1 of endless type is wound on the seal ring set body 3, the seal ring 1 is fitted stretched like a rubber band. Therefore the seal ring 1 needs to have a certain degree of elasticity and is required to recover its original form immediately after the fitting.

In order to endow the PTFE seal ring with elasticity (recoverability of form), there have been proposed the following methods:
(1) a method of shortening a sintering time of PTFE,
(2) a method of rapidly cooling after sintering of PTFE, and the like.

However when importance is attached to suitability for fitting (elasticity and recoverability of form), sliding durability under high pressure becomes insufficient, and when importance is attached to sliding durability under high pressure, suitability for fitting becomes inferior.

Such problems of the seal ring are important problems to be solved particularly in the devices of automobile such as a power steering in which importance is placed on the feeling and the safety during driving.

As a result of various studies to develop a seal ring having well-balanced sliding durability under high pressure and suitability for fitting, the inventors of the present invention have found that an intended effect can be obtained by controlling crystallinity of PTFE of the seal ring so that it is within a specific range and have filed the previous patent application.

In the process of conducting further studies with respect to the prior invention, the inventors have found that when a specific modified PTFE is used, even if the crystallinity is set wide, excellent suitability for fitting is obtained while maintaining necessary sliding durability under high pressure, and thus the inventors have completed the present invention.

DISCLOSURE OF INVENTION

That is, the present invention relates to a seal ring with a sliding surface, which is obtained by molding a molding powder or granulated powder of non-melt-moldable modified polytetrafluoroethylene containing 0.01 to 1% by weight of a perfluorovinylether unit represented by the formula (I):

$$—CF_2—CF(—O—X)—\quad\quad(I)$$

wherein X represents a perfluoroalkyl group having 1 to 6 carbon atoms or a perfluoroalkoxyalkyl group having 2 to 9 carbon atoms, said modified polytetrafluoroethylene having a heat of crystallization of 18 to 25 J/g, preferably from 18.0 to 23.5 J/g measured by a differential scanning calorimeter.

The seal ring of the present invention may not always contain a filler. As the filler, it is desirable to use a heat resistant aromatic polyoxybenzoyl ester resin powder, graphite powder, carbon fiber, bronze powder or a mixture of these.

The seal ring of the present invention is useful particularly for a power steering valve.

It is preferable from the viewpoint of sliding durability under high pressure that the seal ring is one which does not break after 200,000 cycles under the following conditions (1):
 Test equipment: Test equipment for evaluating durability of a seal ring having basically the same mechanism as a rack and pinion type power steering system
 Oil pressure: 12 MPa
 Oil temperature: 120° C.
 Kind of oil: Power steering fluid
 Cycle: One cycle consisting of a normal rotation at 95 rpm for 2 seconds and a reverse rotation at 95 rpm for 2 seconds
 Opposite material: Aluminum die cast (JIS H5302)
 Seal ring-mounting member: Carbon steel (JIS G4051).

Also it is preferable from the viewpoint of sliding durability under high pressure that the seal ring is one which does not break after 200,000 cycles under the following conditions (2):
 Test equipment: Test equipment for evaluating durability of a seal ring having basically the same mechanism as a rack and pinion type power steering system
 Oil pressure: 13 MPa
 Oil temperature: 135° C.
 Kind of oil: Power steering fluid
 Cycle: One cycle consisting of a normal rotation at 95 rpm for 2 seconds and a reverse rotation at 95 rpm for 2 seconds
 Opposite material: Aluminum die cast (JIS H5302)
 Seal ring-mounting member: Carbon steel (JIS G4051).

It is further preferable from the viewpoint of sliding durability under high pressure that the seal ring is one which does not break after 200,000 cycles under the following conditions (3):
 Test equipment: Test equipment for evaluating durability of a seal ring having basically the same mechanism as a rack and pinion type power steering system
 Oil pressure: 15 MPa
 Oil temperature: 135° C.
 Kind of oil: Power steering fluid
 Cycle: One cycle consisting of a normal rotation at 95 rpm for 2 seconds and a reverse rotation at 95 rpm for 2 seconds
 Opposite material: Aluminum die cast (JIS H5302)
 Seal ring-mounting member: Carbon steel (JIS G4051).

BEST MODE FOR CARRYING OUT THE INVENTION

Figure 1:
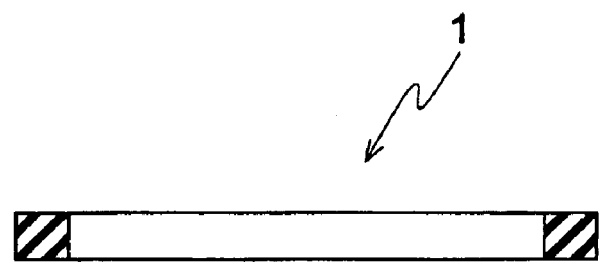
FIG. 1 is a diagrammatic cross-sectional view of one embodiment of the seal ring of the present invention.
Figure 2:
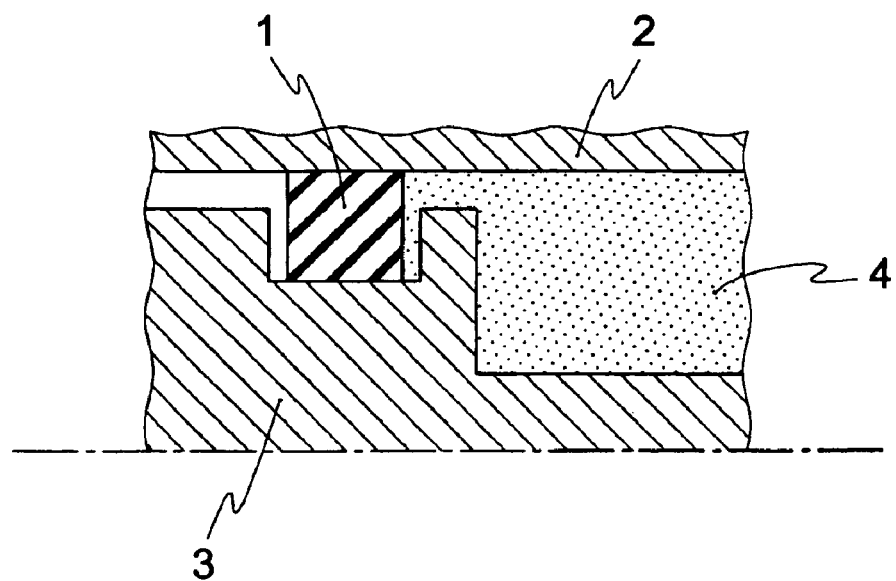
FIG. 2 is a partial diagrammatic cross-sectional view of a device equipped with the seal ring of the present invention.

The seal ring of the present invention is produced by molding modified PTFE powder through various known molding methods, for example, compression molding method, ram extrusion molding method, paste extrusion molding method, isostatic molding method, hot coining molding method, etc.

Examples of the modified PTFE powder as a starting material are those which are not melt-moldable, contain from 0.01 to 1% by weight of the perfluoro vinyl ether unit represented by the above-mentioned formula (I) and have a heat of crystallization measured with a differential scanning calorimeter of from 18 to 25 J/g.

Examples of the perfluoro(vinyl ether) represented by the above-mentioned formula (I) are, for instance, perfluoro (alkyl vinyl ether)s such as perfluoro(methyl vinyl ether) (PMVE), perfluoro(ethyl vinyl ether) (PEVE), perfluoro (propyl vinyl ether) (PPVE), perfluoro(butyl vinyl ether) (PBVE), perfluoro(pentyl vinyl ether) and perfluoro(hexyl vinyl ether); perfluoro(alkoxy vinyl ether)s such as perfluoro (2-methoxy propyl vinyl ether) and perfluoro(2-propoxy propyl vinyl ether); and the like. Among them, preferred are perfluoro(propyl vinyl ether) and perfluoro(2-propoxy propyl vinyl ether) from the viewpoint of relatively inexpensive vinyl ether monomer.

The proportion (% by weight) of PTFE powder/filler is 60 to 97 wt % PTFE powder/40 to 3 wt % filler (100% by weight in total), preferably 70 to 95 wt % PTFE powder/30 to 5 wt % filler, particularly preferably 80 to 90 wt % PTFE powder/20 to 10 wt % filler. If the amount of the filler is too large, inherent properties of the PTFE are lowered. If the amount of the filler is too small, self-abrasion resistance and sealing performance at high pressure are lowered.

A content of the pefluoro(vinyl ether) unit is from 0.01 to 1% by weight, preferably from 0.3 to 1.0% by weight. When the content is too small, creep resistance tends to be lowered. When the content is too large, heat resistance, tensile strength and crack resistance are lowered, and though a large amount of expensive perfluoro(vinyl ether) is used, an effect of improving sliding durability under high pressure and creep resistance is small, which is economically disadvantageous.

It is preferable that the modified PTFE of the present invention has a melt viscosity (380° C.) of from $5.0 \times 10^9$ to $1 \times 10^{11}$ poise. The modified PTFE having a melt viscosity within the above-mentioned range has a relatively large molecular weight and is not melt-moldable. Such a modified PTFE having a high molecular weight has a heat of crystallization measured with a differential scanning calorimeter of from 18 to 25 J/g.

When the ultra high molecular weight modified PTFE having the above-mentioned structure and characteristics is used, a seal ring having an excellent sliding durability under high pressure and suitability for fitting can be obtained in a wide range of crystallinity.

An average particle size of the modified PTFE powder is from 10 to 120 μm, preferably from 10 to 50 μm.

A filler may be contained in the seal ring of the present invention. Example of particularly preferred filler is a heat resistant aromatic polyoxybenzoyl ester resin powder, graphite powder, carbon fiber, bronze powder or a mixture of these.

A powder of a resin having a structural unit (II):

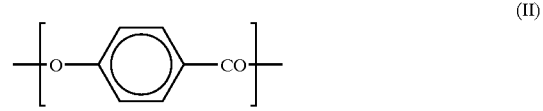

is preferred as the heat resistant aromatic polyoxybenzoyl ester resin powder from the viewpoint of excellent heat resistance, chemical resistance and abrasion resistance. In addition to the structural unit (II), the resin powder may have the structural unit (III) and/or (IV):

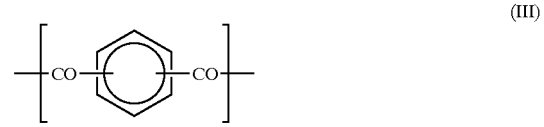

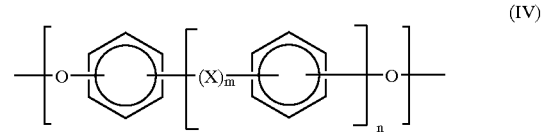

wherein X is —O—, m is 0 or 1, n is 0 or 1. Examples of commercially available resin powder are, for instance, SUMICA SUPER (trademark, available from Sumitomo Chemical Company, Limited), EKONOL (trademark, available from Carborandum Co., Ltd.), etc. It is preferable that the average particle size is from 1 to 300 μm, more preferably from 5 to 150 μm, particularly preferably from 10 to 50 μm from the viewpoint of good dispersibility of the resin powder and excellent strength of the obtained seal ring.

The heat resistant aromatic polyoxybenzoyl ester resin powder may be subjected to surface treatment with a silane coupling agent, etc. or various water repelling treatments.

Examples of graphite powder are, for instance, natural graphite, artificial graphite, expanded graphite, graphite fluoride, spherical carbon, carbon fluoride, graphite whisker, etc. Particularly preferred is a natural graphite powder. It is preferable that the average particle size of the graphite powder is from 0.1 to 500 μm, particularly preferably from 5 to 20 μm.

Examples of carbon fiber are preferably, for instance, those having an average fiber diameter of from 5 to 50 μm and an average fiber length of from 30 to 1,000 μm, particularly preferably an average fiber diameter of from 10 to 20 μm and an average fiber length of from 50 to 200 μm.

Examples of bronze powder are, for instance, an alloy of copper and tin and the alloy of copper and tin containing at least one of metal elements such as aluminum, zinc, lead, chromium, nickel, iron, molybdenum, manganese and phosphorus. An average particle size of the bronze powder is from 5 to 500 μm, preferably from 10 to 100 μm.

In addition, a filler such as molybdenum disulfide, boron nitride, tungsten disulfide, mica or polyimide may be added.

The proportion (% by weight) of PTFE powder and filler is 60 to 97/40 to 3 (100% by weight in total), preferably 70 to 95/30 to 5, particularly preferably 80 to 90/20 to 10. If the amount of the filler is too large, inherent properties of the PTFE are lowered. If the amount of the filler is too small, self-abrasion resistance and sealing performance at high pressure are lowered.

The above-mentioned powders are mixed by usual method, and if required, are granulated to be formed into a resin powder for molding into a seal ring and are molded into the seal ring by various known molding methods, for example, compression molding method, ram extrusion molding method, paste extrusion molding method, isostatic molding method, hot coining molding method, etc. In any of those molding methods, the molded article is finally subjected to sintering. In the present invention, the sintering temperature is from 323° to 400° C., preferably from 350° to 385° C.

The feature of the present invention is such that the molding conditions can be relaxed since suitability for fitting necessary for seal rings to be obtained can be enhanced while maintaining sliding durability under high pressure in a wide range of crystallinity by using the high molecular weight modified PTFE.

Generally, the higher the crystallinity is, the better the mechanical properties are. However in the present invention the crystallinity can be selected in a wide range. For example, even in case of a crystallinity of as low as less than 25%, the sliding durability under high pressure the present invention required can be maintained. The crystallinity is preferably from 20 to 35%, more preferably from 23 to 35%.

The crystallinity can be adjusted, for example, by (A) a method of controlling cooling speed after sintering (if the cooling speed is fast, crystallinity becomes low; concretely, there is a method of removing a molded article from a sintering oven immediately after the sintering and then cooling alone in the air for rapid cooling), (B) a method of controlling heating speed before the sintering (if the heating speed is fast, crystallinity becomes low), (C) a method of controlling sintering time (if the sintering time is short, crystallinity becomes low), (D) a method of controlling sintering temperature (if the sintering temperature is low, crystallinity becomes low), or the like method. According to the present invention, a selectable range of the crystallinity can be widened, and conditions and operation in the above-mentioned methods can be relaxed and eased.

From the viewpoint of easy control and reduction of sintering steps, preferred is the method (A). In the method (A), it is preferable that after the sintering, the cooling speed is controlled by cooling alone in the air at room temperature (10° to 30° C.) or by cooling in water of not more than 15° C. If the cooling speed is increased, the crystallinity becomes low and the sliding durability under high pressure is lowered. However, according to the present invention, even if the crystallinity becomes somewhat low, the required sliding durability under high pressure can be obtained sufficiently. Therefore the cooling time can be shortened, and also since there occurs no problem even if a certain range of cooling temperature is allowed, temperature control can be simplified.

As the crystallinity is increased, there is a tendency that the sliding durability under high pressure is enhanced but suitability for fitting (recoverability) is lowered, and on the contrary, as the crystallinity is decreased, the sliding durability under high pressure is lowered but suitability for fitting (recoverability) is enhanced. Therefore, when importance is attached to the sliding durability under high pressure, the modified PTFE having a high crystallinity may be used, and when importance is attached to the suitability for fitting, the modified PTFE having a low crystallinity may be used.

Further, there is a case where a preferable range of crystallinity arises depending on kind and adding amount of the filler.

The so obtained seal ring has an excellent durability such that when the measurement is made under the above-mentioned test conditions (1), breakage of the seal ring does not occur even after 200,000 cycles.

Examples of devices having a sliding surface on which the seal ring of the present invention is used are a hydraulic power steering, automatic transmission, engine piston ring, shock absorber, etc. for automobiles and a hydraulic cylinder, etc. for industrial machinery. Among them, the seal ring is suitable as a seal ring of endless type for a power steering valve, which is particularly required to have characteristics such as a small resistance at sliding, a smaller wear amount of the opposite material, a small deformation of the seal ring under high pressure (not less than 8 MPa), and less leakage of oil even in case of the use for a long period of time.

The present invention is then explained by means of examples, but is not limited to them.

EXAMPLE 1

A resin powder for molding was prepared by pre-mixing, by usual method, 90% by weight of PTFE powder having an average particle size of 30 μm and modified with 1% by weight of perfluoro(propyl vinyl ether) (melt viscosity (380° C.): $1.3 \times 10^{10}$ poise, heat of crystallization: 23.4 J/g, hereinafter referred to as "Modified PTFE 1"), 5% by weight of heat resistant aromatic polyoxybenzoyl ester resin powder (SUMICA SUPER available from Sumitomo Chemical Company, Limited, average particle size: 20 μm, referred to as "POB" in tables) and 5% by weight of natural graphite powder (CPB-3000 available from Chuetsu Kokuen Kabushiki Kaisha, average particle size: 9 μm, referred to as "GR" in tables) and then granulating the mixture.

The melt viscosity and heat of crystallization are measured by the following methods.

(Measurement of Melt Viscosity)

A dynamic visco-elasticity is measured at 380° C. with a visco-elasticity meter Model RDS-2 available from Rheometrics Co., Ltd. Frequency is from 0.001 to 500 rad/sec. Measuring points for sampling are five points per one digit at regular intervals in a logarithmic scale. Measurements are repeated until in successive two measurements, an average of deviations of G'(ω) in each measuring frequency becomes not more than 5%.

(Measurement of Heat of Crystallization with Differential Scanning Calorimeter (DSC))

About 3 mg of un-sintered powder precisely measured is put in an aluminum pan and measurement is made with DSC (RDC220 available from Seiko Denshi Kogyo Kabushiki Kaisha). Firstly, the aluminum pan is heated up to 250° C. in $N_2$ atmosphere and then allowed to stand for one minute, and further heated up to 380° C. at a heating rate of 10° C./min to sufficiently melt crystals. Then cooling from 380° C. to 250° C. at a cooling rate of 10° C./min is carried out and a heat of crystallization at a crystallizing point is measured. The value of heat of crystallization is obtained from an area surrounded by a peak curve and a tangential line drawn from the point of 275° C. to the other side of the peak curve in an obtained DSC chart.

The resin powder for molding was subjected to compression molding into a form of seal ring, and after sintering at 360° C. for 48 minutes, spontaneous cooling in the air was carried out at an ambient temperature (room temperature: 15° C.) to obtain a seal ring for testing (a ring having an inner diameter: 33.4 mm, an outer diameter: 36.4 mm and a height of 1.88 mm). The crystallinity of the seal ring for testing was measured by the following method. The results are shown in Table 1.

(Measurement of Crystallinity)
  Measuring device: Differential scanning colorimeter model RDC220 available from Seiko Denshi Kogyo Kabushiki Kaisha
  Measuring conditions: The seal ring is heated up from room temperature to 250° C. at a heating rate of 50° C./min, allowed to stand at 250° C. for one minute, heated up to 380° C. at a heating rate of 10° C./min and then allowed to stand at 380° C. for one minute.
  Calculation: The crystallinity is calculated by the following equation.

Crystallinity (%)=(Measured heat of melting/Heat of melting of 100% crystallized PTFE)×100

The heat of melting of 100% crystallized PTFE is 92.93 J/g in the above-mentioned measuring conditions.

The seal ring for testing was subjected to testing for evaluating suitability for fitting and durability. The results are shown in Table 1.

(Suitability for Fitting)
The seal ring for testing is passed round a tapered jig of frustum form (inclination: 1/10) to enlarge an inner diameter of the seal ring by 10%, and then immediately an outer diameter of the seal ring is measured. ((Outer diameter after test—Outer diameter before test)/Outer diameter before test)×100 is assumed to be a variation of outer diameter.

(Durability Test)
  Test equipment: Test equipment for evaluating durability of a seal ring having basically the same mechanism as a rack and pinion type power steering system
  Oil pressure: 12 MPa
  Oil temperature: 120° C.
  Kind of oil: Power steering fluid (RODEO PSF available from Nippon Mitsubishi Oil Corporation)
  Sliding cycle: One cycle consisting of a normal rotation at 95 rpm for 2 seconds and a reverse rotation at 95 rpm for 2 seconds
  Opposite material: Aluminum die cast ADC12 (JIS H5302)
  Seal ring-mounting member: Carbon steel S45C (JIS G4051)
  Evaluation of properties:
(Life of Seal Ring)
The number of sliding cycles at which the seal ring is broken (to cause oil leakage) is assumed to be the life of the seal ring. The test is stopped when the seal ring does not break after 200,000 cycles.

EXAMPLE 2

The seal ring of the present invention was produced in the same manner as in Example 1 except that spontaneous cooling was carried out in the air at 20° C. of room temperature, and crystallinity, suitability for fitting and durability of the seal ring were evaluated in the same manner as in Example 1. The results are shown in Table 1.

EXAMPLE 3

The seal ring of the present invention was produced in the same manner as in Example 1 except that spontaneous cooling was carried out in the air at 25° C. of room temperature, and crystallinity, suitability for fitting and durability of the seal ring were evaluated in the same manner as in Example 1. The results are shown in Table 1.

COMPARATIVE EXAMPLE 1

A seal ring for comparison was produced in the same manner as in Example 1 (spontaneous cooling in the air at 25° C. of room temperature) except that a PTFE powder modified with 1% by weight of perfluoro(propyl vinyl ether) and having an average particle size of 30 $\mu$m (melt viscosity (380° C.): 6.5×10$^9$ poise, heat of crystallization: 30.2 J/g, hereinafter referred to as "Modified PTFE 2") was used as a modified PTFE powder. Crystallinity, suitability for fitting and durability of the seal ring were evaluated in the same manner as in Example 1. The results are shown in Table 1.

TABLE 1

|  | Ex. 1 | Ex. 2 | Ex. 3 | Com. Ex. 1 |
|---|---|---|---|---|
| Modified PTFE (part by weight) | 90 | 90 | 90 | 90 |
| POB (part by weight) | 5 | 5 | 5 | 5 |
| GR (part by weight) | 5 | 5 | 5 | 5 |
| Crystallinity (%) | 22.5 | 24.0 | 24.5 | 23.0 |
| Suitability for fitting (variation of outer diameter (%)) | 2.5 | 2.8 | 3.0 | 2.7 |
| Life of seal ring (cycle) | 200,000 (stopped) | 200,000 (stopped) | 200,000 (stopped) | 160,000 (broken) |

EXAMPLES 4 TO 9 AND COMPARATIVE EXAMPLES 2 TO 4

The seal rings were produced in the same manner as in Example 1 except that the modified PTFE and the filler were changed as shown in Table 2, and crystallinity and durability were evaluated in the same manner as in Example 1. The results are shown in Table 2. In Examples 7 to 9, after the sintering, the cooling was carried out at a rate of 50° C./hr instead of the spontaneous cooling in the air.

Abbreviations in Tables 2, 3 and 4 represent the following PTFE resins and fillers.

Modified PTFE 1 (heat of crystallization: 23.4 J/g)
Modified PTFE 2 (heat of crystallization: 30.2 J/g)
Bz: Bronze powder (SD-200 available from Fukuda Kinzoku Kabushiki Kaisha, average particle size: 20 $\mu$m)
GRA: Artificial graphite powder (EG-1C available from Nippon Carbon Kabushiki Kaisha, average particle size: 35 $\mu$m)
CF: Carbon fiber (M2006S available from Kabushiki Kaisha Kureha, average fiber diameter: 15 $\mu$m, average fiber length: 100 $\mu$m)
POB: Heat resistant aromatic polyoxybenzoyl ester resin powder (SUMICA SUPER available from Sumitomo Chemical Company, Limited, average particle size: 20 $\mu$m)
GR: Natural graphite powder (CPB-3000 available from Chuetsu Kokuen Kabushiki Kaisha, average particle size: 9 $\mu$m)

TABLE 2

|  | Ex. 4 | Ex. 5 | Ex. 6 | Ex. 7 |
|---|---|---|---|---|
| Modified PTFE (% by weight) | Modified PTFE 1 (100) | Modified PTFE 1 (89) | Modified PTFE 1 (60) | Modified PTFE 1 (100) |
| Filler (% by weight) |  | CF (4) GRA (7) | Bz (30) CF (10) |  |
| Crystallinity (%) | 19.5 | 19.6 | 19.5 | 27.0 |
| Life of seal ring (cycle) | 32,600 (broken) | 86,600 (broken) | 173,600 (broken) | 35,100 (broken) |

TABLE 2-continued

|  | Ex. 8 | Ex. 9 | Com. Ex. 2 | Com. Ex. 3 | Com. Ex. 4 |
|---|---|---|---|---|---|
| Modified PTFE (% by weight) | Modified PTFE 1 (89) | Modified PTFE 1 (60) | Modified PTFE 2 (100) | Modified PTFE 2 (89) | Modified PTFE 2 (60) |
| Filler (% by weight) | CF (4) GRA (7) | Bz (30) CF (10) |  | CF (4) GRA (7) | Bz (30) CF (10) |
| Crystallinity (%) | 30.6 | 27.8 | 27.0 | 30.6 | 27.8 |
| Life of seal ring (cycle) | 100,500 (broken) | 187,900 (broken) | 21,100 (broken) | 36,800 (broken) | 62,700 (broken) |

EXAMPLE 10 AND COMPARATIVE EXAMPLE 5

The seal rings were produced in the same manner as in Example 1 except that the modified PTFE and the filler were changed as shown in Table 3, and crystallinity and durability were evaluated in the same manner as in Example 1. The results are shown in Table 3. A durability test was carried out under the following conditions.

(Durability Test)
Test equipment: Test equipment for evaluating durability of a seal ring having basically the same mechanism as a rack and pinion type power steering system
Oil pressure: 13 MPa
Oil temperature: 135° C.
Kind of oil: Power steering fluid (RODEO PSF available from Nippon Mitsubishi Oil Corporation)
Sliding cycle: One cycle consisting of a normal rotation at 95 rpm for 2 seconds and a reverse rotation at 95 rpm for 2 seconds
Opposite material: Aluminum die cast ADC12 (JIS H5302)
Seal ring-mounting member: Carbon steel S45C (JIS G4051)

TABLE 3

|  | Ex. 10 | Com. Ex. 5 |
|---|---|---|
| Modified PTFE (% by weight) | Modified PTFE 1 (80) | Modified PTFE 2 (80) |
| Filler (% by weight) | POB (15) CF (5) | POB (15) CF (5) |
| Crystallinity (%) | 21.8 | 26.8 |
| Life of seal ring (cycle) | 200,000 (stopped) | 141,800 (broken) |

EXAMPLE 11 AND COMPARATIVE EXAMPLE 6

The seal rings were produced in the same manner as in Example 1 except that the modified PTFE and the filler were changed as shown in Table 4, and crystallinity and durability were evaluated in the same manner as in Example 1. The results are shown in Table 4. A durability test was carried out under the following conditions.

(Durability Test)
Test equipment: Test equipment for evaluating durability of a seal ring having basically the same mechanism as a rack and pinion type power steering system
Oil pressure: 15 MPa
Oil temperature: 135° C.
Kind of oil: Power steering fluid (RODEO PSF available from Nippon Mitsubishi Oil Corporation)
Sliding cycle: One cycle consisting of a normal rotation at 95 rpm for 2 seconds and a reverse rotation at 95 rpm for 2 seconds
Opposite material: Aluminum die cast ADC12 (JIS H5302)
Seal ring-mounting member: Carbon steel S45C (JIS G4051)

TABLE 4

|  | Ex. 11 | Com. Ex. 6 |
|---|---|---|
| Modified PTFE (% by weight) | Modified PTFE 1 (95) | Modified PTFE 2 (95) |
| Filler (% by weight) | GR (5) | GR (5) |
| Crystallinity (%) | 19.8 | 27.1 |
| Life of seal ring (cycle) | 200,000 (stopped) | 98,800 (broken) |

As is clear from the results shown in Tables 2, 3 and 4, it can be seen that in case of Modified PTFE 1 having a heat of crystallization of 23.4 J/g, durability thereof is greatly excellent as compared with Modified PTFE 2 having a heat of crystallization of 30.2 J/g.

INDUSTRIAL APPLICABILITY

The seal ring of the present invention is excellent since the seal ring has a high durability under sliding at high pressure during a long-term use, and a necessary suitability for fitting. Therefore the seal ring can provide an effect of sealing oil stably for a long period of time, and possesses properties suitable particularly for a seal ring of endless type.

What is claimed is:

1. A seal ring with a sliding surface, which has a crystallinity of less than 25% and is obtained by molding a molding powder or granulated powder of non-melt-moldable modified polytetrafluoroethylene containing 0.01 to 1% by weight of a perfluorovinylether unit represented by the formula (I):

$$-CF_2-CF(-O-X)- \qquad (I)$$

wherein X represents a perfluoroalkyl group having 1 to 6 carbon atoms or a perfluoroalkoxyalkyl group having 2 to 9 carbon atoms,
said modified polytetrafluoroethylene having a heat of crystallization of 18 to 25 J/g measured by a differential scanning calorimeter.

2. The seal ring of claim 1, wherein the heat of crystallization of the modified polytetrafluoroethylene is from 18.0 to 23.5 J/g.

3. The seal ring of claim 1, which contains a filler.

4. The seal ring of claim 3, wherein the filler is at least one selected from the group consisting of a heat resistant aromatic polyoxybenzoyl ester resin powder, graphite powder, carbon fiber, bronze powder and molybdenum disulfide.

5. The seal ring of claim 1 which is used for oil sealing.

6. The seal ring of claim 1, which is used for a power steering valve.

7. The seal ring of claim 1, wherein the seal ring does not break after 200,000 cycles under the following conditions:

Test equipment: Test equipment for evaluating durability of a seal ring having basically the same mechanism as a rack and pinion type power steering system Oil pressure: 12 MPa Oil temperature: 120° C.

Kind of oil: Power steering fluid

Cycle: One cycle consisting of a normal rotation at 95 rpm for 2 seconds and a reverse rotation at 95 rpm for 2 seconds Opposite material: Aluminum die cast (JIS H5302)

Seal ring-mounting member: Carbon steel (JIS G4051).

8. The seal ring of claim 1, wherein the seal ring does not break after 200,000 cycles under the following conditions:

Test equipment: Test equipment for evaluating durability of a seal ring having basically the same mechanism as a rack and pinion type power steering system Oil pressure: 13 MPa Oil temperature: 135° C.

Kind of oil: Power steering fluid

Cycle: One cycle of a normal rotation at 95 rpm for 2 seconds and a reverse rotation at 95 rpm for 2 seconds Opposite material: Aluminum die cast (JIS H5302)

Seal ring-mounting member: Carbon steel (JIS G405 1).

9. The seal ring of claim 1, wherein the seal ring does not break after 200,000 cycles under the following conditions:

Test equipment: Test equipment for evaluating durability of a seal ring having basically the same mechanism as a rack and pinion type power steering system Oil pressure: 15 MPa Oil temperature: 135° C.

Kind of oil: Power steering fluid

Cycle: One cycle of a normal rotation at 95 rpm for 2 seconds and a reverse rotation at 95 rpm for 2 seconds Opposite material: Aluminum die cast (JIS H5302)

Seal ring-mounting member: Carbon steel (JIS G405 1).

* * * * *